(12) United States Patent
Ziv-Av

(10) Patent No.: US 6,401,758 B1
(45) Date of Patent: Jun. 11, 2002

(54) VARIABLE PITCH THREAD CONFIGURATION

(76) Inventor: Amir Ziv-Av, 3 Hanasi, Kiryat Ono (IL)

( * ) Notice: Subject to any disclaimer, the term of this patent is extended or adjusted under 35 U.S.C. 154(b) by 0 days.

(21) Appl. No.: 09/680,472

(22) Filed: Oct. 6, 2000

(51) Int. Cl.⁷ .................................. F15D 1/02
(52) U.S. Cl. .................... 138/43; 138/46; 138/122; 138/156
(58) Field of Search ................. 138/121, 122, 138/43, 46, 39, 151, 114, 156

(56) References Cited

U.S. PATENT DOCUMENTS

| | | | | | |
|---|---|---|---|---|---|
| 970,772 | A | * | 9/1910 | Wold | 138/156 |
| 1,852,921 | A | * | 4/1932 | Dreyer | 138/121 |
| 2,606,953 | A | * | 8/1952 | Weston | 138/121 |
| 3,667,506 | A | * | 6/1972 | Jocteur | 138/122 |
| 4,214,147 | A | * | 7/1980 | Kraver | 138/121 |
| 4,766,662 | A | * | 8/1988 | Bradshaw et al. | 138/151 |
| 5,160,811 | A | * | 11/1992 | Ritzmann | 138/121 |
| 5,456,959 | A | * | 10/1995 | Dawes | 428/36.91 |
| 6,129,120 | A | * | 10/2000 | Margot | 138/121 |

* cited by examiner

*Primary Examiner*—James Hook
(74) *Attorney, Agent, or Firm*—Mark M. Friedman

(57) ABSTRACT

An apparatus for providing a variable pitch thread includes a hollow cylindrical element configured to provide a plurality of parallel, radially projecting ridges extending circumferentially around the cylindrical element and spaced apart with a given step as measured parallel to a central axis of the cylindrical element. The cylindrical element also featuring a slit extending substantially parallel to the central axis along the length of the cylinder. An actuation mechanism is configured to selectively generate controlled relative displacement between the opposing edges on opposing sides of the slit so as to vary a helical angle of the projecting ridges relative to the central axis. The actuation mechanism is preferably configured to relatively displace the opposing edges such that the plurality of projecting ridges together form alternatively a helical pattern and a pattern of substantially closed rings.

19 Claims, 6 Drawing Sheets

VARIABLE PITCH THREAD CONFIGURATION

FIELD AND BACKGROUND OF THE INVENTION

The present invention relates to mechanical devices employing screw-like threaded configurations and, in particular, it concerns an apparatus which provides a variable pitch thread.

A multitude of devices employ elements with a helical thread, such as screws and bolts, for a range of different functions including adjustment, attachment and generating motion. Some devices employ helical channels for flow regulation. Others employ rotating rods with helical flanges to act as a conveyor for various materials. In certain cases the helix is right-handed while in others a left-handed helix is used.

In all cases known to the applicant, all such helical configurations, referred to herein generically as "threaded" configurations, have a fixed pitch. In other words, the step traveled by an object engaged with the thread during a single 360° revolution of the structure, equal to the distance between adjacent turns of the thread, has a single fixed value determined during manufacture and which cannot later be varied.

It would be highly advantageous for a wide range of applications to provide a thread configuration which would allow the pitch of the thread to be varied.

SUMMARY OF THE INVENTION

The present invention is an apparatus with a variable pitch thread.

According to the teachings of the present invention there is provided, an apparatus comprising: (a) a hollow cylindrical element having a first end, a second end and defining a virtual central axis, the cylindrical element being configured to provide a plurality of parallel, radially projecting ridges extending circumferentially around the cylindrical element and spaced apart with a given step as measured parallel to the central axis, the cylindrical element further featuring a slit extending substantially parallel to the central axis from the first end to the second end, the slit being bordered by opposing edges; and (b) an actuation mechanism configured to selectively generate controlled relative displacement between the opposing edges so as to vary a helical angle of the projecting ridges relative to the central axis.

According to a further feature of the present invention, the actuation mechanism is configured to relatively displace the opposing edges such that the plurality of projecting ridges together form alternatively a helical pattern and a pattern of substantially closed rings.

According to a further feature of the present invention, the actuation mechanism is configured to apply a torque between the first and second ends about the central axis.

According to a further feature of the present invention, the cylindrical element is configured such that, in the absence of an externally applied torque, each of the radially projecting ridges approximates to a closed circumferential ridge.

According to a further feature of the present invention, the cylindrical element is configured such that, in the absence of an externally applied torque, the plurality of radially projecting ridges together approximate to a single threaded configuration.

According to a further feature of the present invention, the radially projecting ridges project radially inwards. According to an alternative, or additional, feature of the present invention, the radially projecting ridges project radially outwards.

According to a further feature of the present invention, there is also provided a rider mounted on the cylindrical element, the rider having at least one engagement feature configured for interlocking engagement with at least part of at least two of the radially projecting ridges.

According to a further feature of the present invention, the rider is implemented as a complementary cylindrical member having a longitudinal slit such that, when the longitudinal slit is aligned substantially opposite the slit of the cylindrical element, the rider conforms substantially to the helical angle.

According to a further feature of the present invention, the rider is implemented as a complementary cylindrical threaded member with a fixed helical angle such that, when the helical angle of the projecting ridges assumes a first value, the rider can be readily rotated relative to the cylindrical element bout the central axis and, when the helical angle of the projecting ridges assumes a second value, the rider is locked against rotation relative to the cylindrical element.

There is also provided according to the teachings of the present invention, a flow-regulating configuration comprising: (a) the aforementioned apparatus; and (b) a cylindrical surface deployed adjacent to the plurality of radially projecting ridges so as to define a variable pitch flow channel between the cylindrical element and the cylindrical surface.

There is also provided according to the teachings of the present invention, a method for producing a variable pitch thread comprising the steps of: (a) providing a hollow, cylindrical element having a first end, a second end and defining a virtual central axis, the cylindrical element being configured to provide a plurality of parallel, radially projecting ridges extending circumferentially around the cylindrical element and spaced apart with a step a as measured parallel to the central axis, the cylindrical element further featuring a slit extending substantially parallel to the central axis from the first end to the second end, the slit being bordered by opposing edges; and (b) relatively displacing the opposing edges so as to vary a helical angle of the projecting ridges relative to the central axis.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is an apparatus which provides a variable pitch thread.

The principles and operation of the apparatus according to the present invention may be better understood with reference to the drawings and the accompanying description.

Figure 1A:
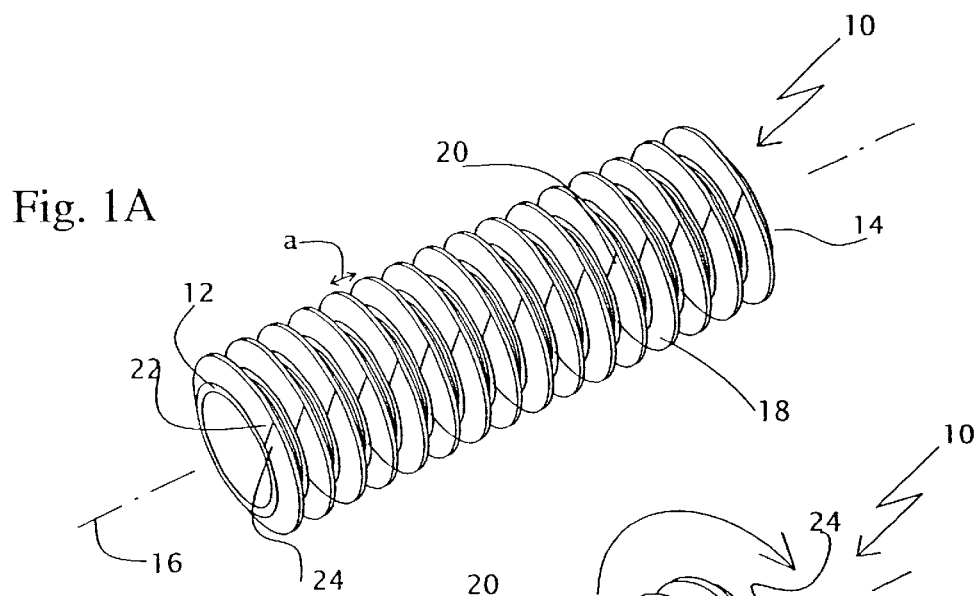
FIG. 1A is a schematic isometric view of an apparatus providing a variable pitch thread, constructed and operative according to the teachings of the present invention, in a first zero-pitch state.
Figure 1B:
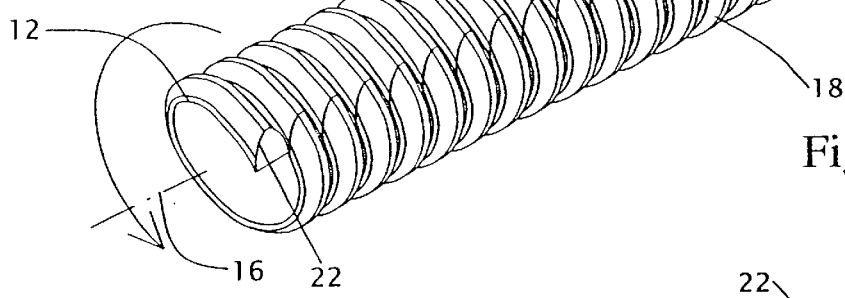
FIG. 1B is a schematic isometric view of the apparatus of FIG. 1A in a second state corresponding to a left-handed thread.
Figure 1C:
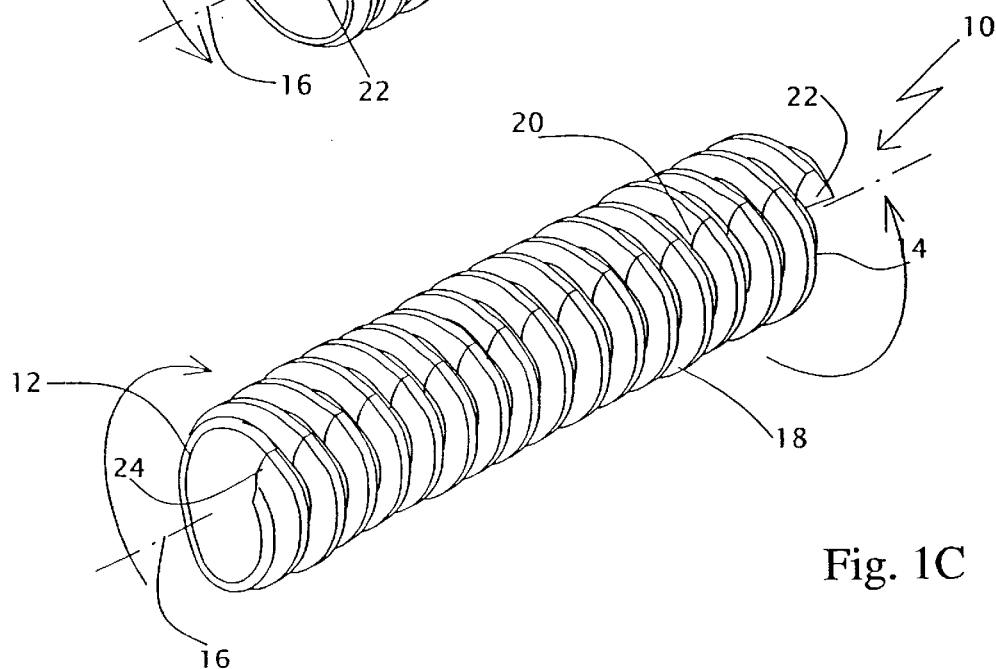
FIG. 1C is a schematic isometric view of the apparatus of FIG. 1A in a third state corresponding to a right-handed thread.

Referring now to the drawings, FIGS. 1A–1C illustrate the underlying principle of the present invention. Thus, there is shown a hollow, cylindrical element 10 having a first end 12, a second end 14 and defining a virtual central axis 16. Cylindrical element 10 is configured to provide a plurality of parallel, radially projecting ridges 18 extending circumferentially around element 10 and spaced apart with a step a as measured parallel to axis 16. Element 10 further features a slit 20, bordered by opposing edges 22 and 24, extending substantially parallel to axis 16 from first end 12 to second end 14.

The presence of slit 20 traversing the entire length of the element allows element 10 to be elastically deformed by a suitable actuation mechanism so as to generate relative axial displacement between edges 22 and 24. This has the effect of varying a helical angle of the projecting ridges relative to the central axis. In a preferred case, the relative displacement is such that the plurality of projecting ridges are alternatively made to form tog ether a helical pattern and a pattern of substantially closed rings. Thus, in the example of FIGS. 1A–1C, the element shown can assume: zero pitch (FIG. 1A), i.e., where ridges 16 each form a substantially closed ring; a left-handed helical pattern (FIG. 1B) corresponding to a left-handed single thread; and a right-handed helical pattern (FIG. 1C) corresponding to a right-handed single thread. Further elastic deformation in either direction can be used to form a double threaded pattern.

Before addressing the features of the present invention in more detail, it will be helpful to define certain terminology as will be used herein in the description and claims. Specifically, the term "helical angle" is used herein to refer to the angle formed between a tangent at a point along a helical element and the projection of that tangent onto a plane perpendicular to the central axis. This angle is also known as the "rise angle" of a helix. The angle is defined herein to be positive for a right-handed helix and negative for a left-handed helix.

Reference is also made to the "pitch" of a helical form. The pitch is here defined to be the step that would be traveled by an object engaged with the thread during a single 360° revolution of the structure about its central axis. The pitch p thus defined is given by $p = \pi D \tan \theta$ where D is the diameter of the helix and $\theta$ is the helical angle.

By way of illustration, in the case of FIG. 1A, both p and $\theta$ are zero. In the cases of FIGS 1B and 1C, the pitch p has a magnitude equal to the spacing between adjacent ridges a. In the former, $\theta$ is negative while in the latter $\theta$ is positive. In the case of a double thread, p would have a magnitude of 2a.

It should be noted that the definition of pitch given here is a theoretical geometrical construct and does not necessarily imply that the element of the present invention is rotatably mounted, as will be evident from a number of the exemplary applications of the invention to be described below.

Figures 2A, 2B:
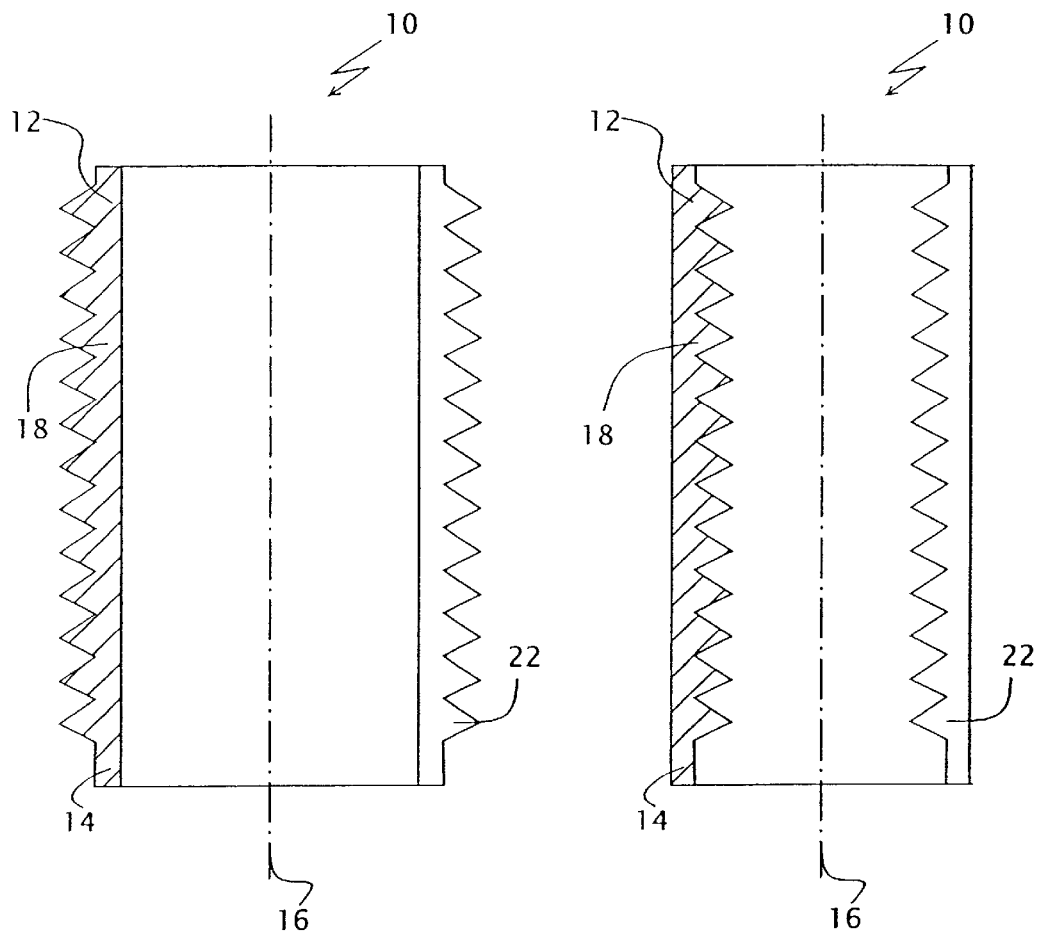
FIG. 2A is a schematic cross-sectional view taken axially through the apparatus of FIG. 1A.
FIG. 2B is a schematic cross-sectional view similar to FIG. 2A but illustrating a reversed configuration.
Figure 3:
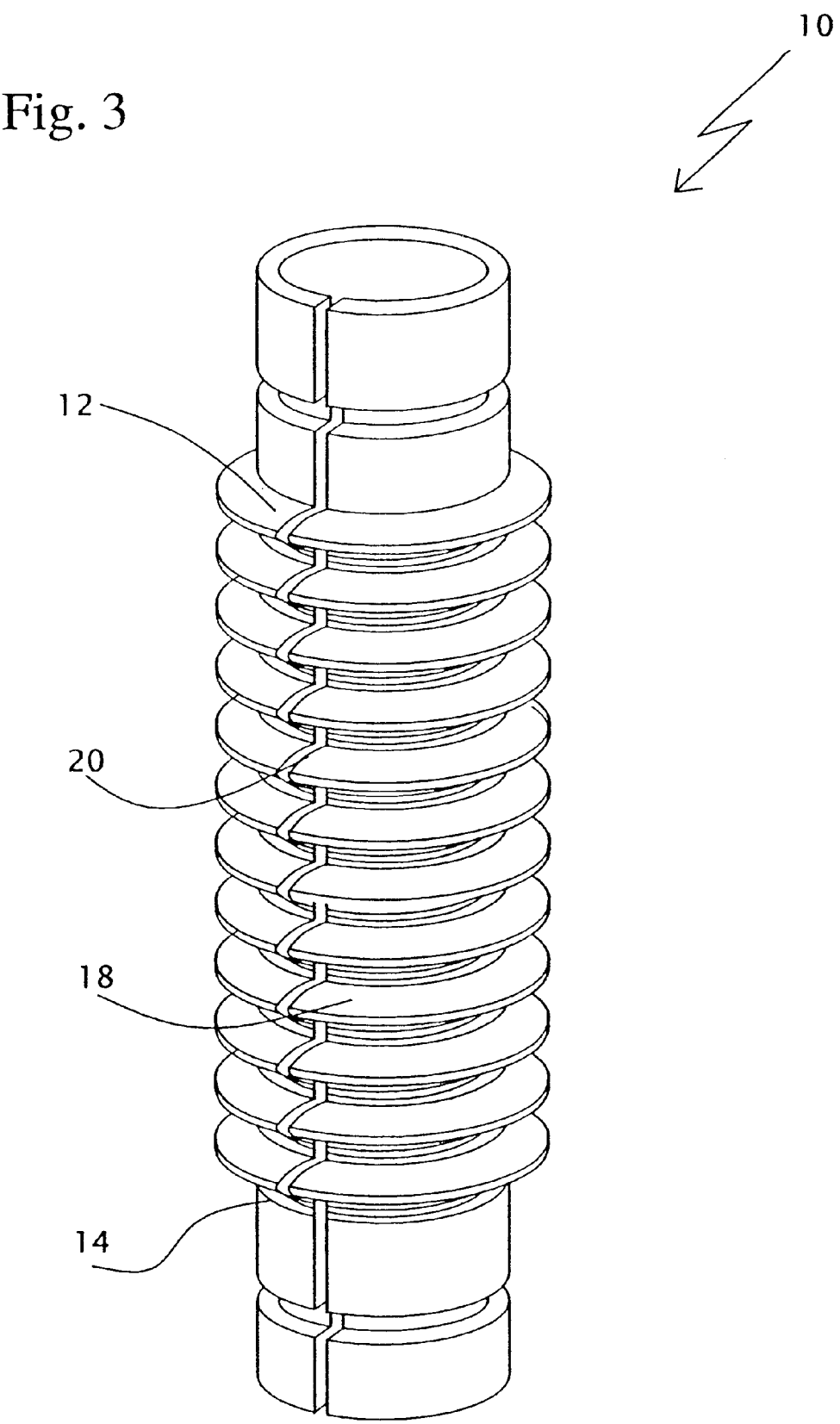
FIG. 3 is a schematic isometric view of a second implementation of an apparatus for providing a variable pitch thread.
Figure 4:
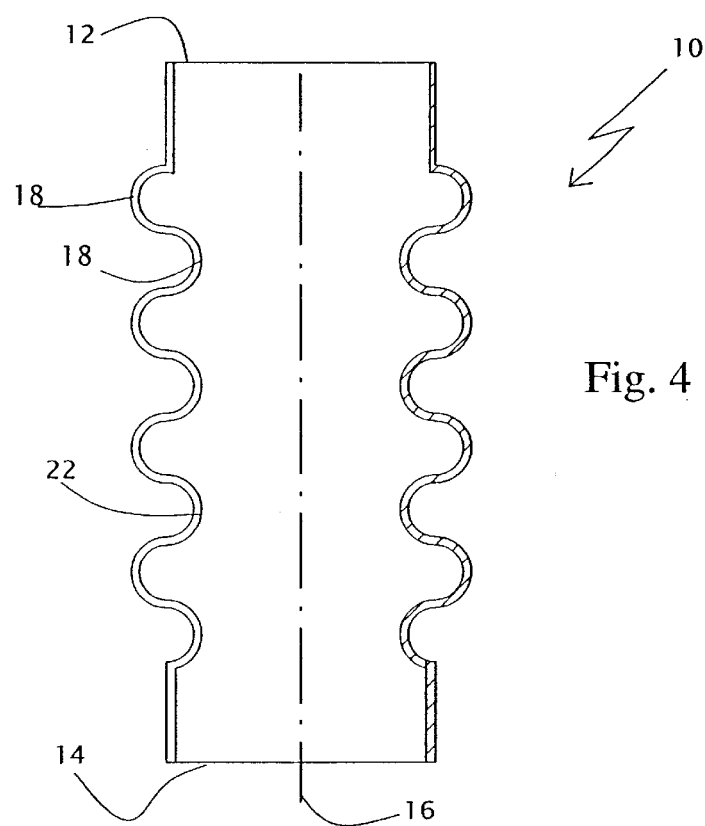
FIG. 4 is a schematic cross-sectional view taken axially through the apparatus of FIG. 3.

Turning now to the features of the present invention in more detail, it should be noted that radially projecting ridges 18 may project either outwards or inwards, or both. FIG. 2A shows a cross-section through the cylindrical element 10 of FIGS. 1A–1C illustrating external ridges, while FIG. 2B shows an internally ridged element. FIGS. 3 and 4, on the other hand, show a an alternative form of cylindrical element 10 formed from a bellows configuration in which a thin wall is formed in an undulating shape to provide alternating inwardly and outwardly projecting ridges 18. All of these structures fall within the aforementioned definition of a cylindrical element with radially projecting ridges. Furthermore, although the various examples of applications of the present invention will be shown herein employing the form of FIG. 2A, it should be appreciated that the various configurations shown may readily be reversed to employ inwardly projecting ridges with correspondingly inverted additional elements.

The relative displacement of opposing edges 22 and 24 may be achieved by a wide range of actuation mechanisms, as will be appreciated by one ordinarily skilled in the art. For certain implementations, it is preferable to use a torque applied between the ends of element 10 to achieve the desired degree of deformation. Thus, the apparatus preferably includes an actuation mechanism mechanically linked to each end of element 10 and configured to apply a torque between the first and second ends about the central axis. This is represented schematically by the curved arrows shown in FIG. 1B and 1C. Any suitable actuator may be used, including but not limited to, mechanical, hydraulic, pneumatic, electromagnetic and manual operated actuators. Where the apparatus is required to switch between predefined states, such as the states of FIGS. 1A–1C, the actuating mechanism may be suitably calibrated either in terms of displacement or of applied torque to produce the appropriate predefined states. In certain applications, particularly where adjustment is required within a range of rotational motion less than one full turn, a continuously variable actuator may be used to provide adjustment to intermediate states between the discrete states defining continuous thread configurations.

Given that the angular displacements required are generally small, it will be appreciated that the actuator used to generate the required torque may be either a rotational actuator or a linear actuator deployed with its line of action offset from the central axis. Furthermore, it will be clear that the actuator need not be directly associated with both ends of element 10. Thus, in many cases, one end of element 10 is fixed to a base or other non-rotating body and an actuator is deployed to apply a torque to the other end of element 10 relative to the base.

Clearly, an essentially unlimited range of actuation mechanisms may be used, selected according to the requirements of each particular application, as is within the capabilities of one ordinarily skilled in the art. Accordingly, the details of the actuation mechanism will not be addressed further herein.

It should be noted that element 10 may be configured to assume an arbitrarily chosen initial configuration in the absence of an applied torque. Thus, if a zero-pitch state is preferred as the default state for a given system, it may be preferred to form element 10 such that the state of FIG. 1A is it's unstressed state. In other application, it may be preferred to form element 10 with a single threaded configuration in it's unstressed state. Where a range of at least three different states is to be used, it may be preferable to form element 10 such that it assumes an intermediate state when unstressed, thereby minimizing the stress on the element during use.

It will be appreciated that the apparatus described thus far may be used to advantage as a component of various systems in a wide range of different applications. By way of illustration, a number of non-limiting examples of assemblies employing the apparatus of the present invention will now be described.

Referring first briefly to the bellows-type configuration of cylindrical element 10 shown in FIGS. 3 and 4, the rounded profile of ridges 18 and the interspersed furrows is particularly suited to certain applications. By way of example, the element of FIGS. 3 and 4 may be used to advantage in the context of a crane, winch or other machine in which cables are wound onto reels as part of a cable-feeding mechanism. Specifically, element 10 is deployed in front of the reel so that the cable engages between two adjacent ridges 18. Element 10 then turns with the cable, either driven passively by frictional contact with the cable or actively synchronized with the reel. As the element turns, the helical configuration guides the cable across the reel to ensure orderly distribution of the cable. An actuation mechanism is deployed to reverse the sense of the helical thread each time the cable reaches one side of the reel, thereby reversing the feed direction.

Figures 5A, 5B:
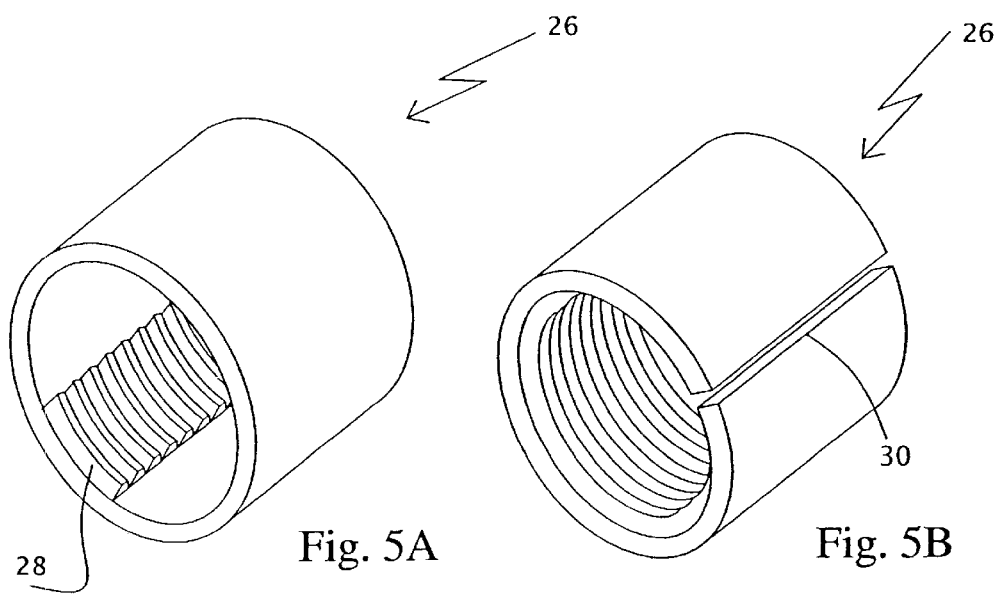
FIG. 5A is a schematic isometric view of a first implementation of a rider for use with the apparatuses of the present invention.
FIG. 5B is a schematic isometric view of a second implementation of a rider for use with the apparatuses of the present invention.

Turning to FIGS. 5A and 5B, a rider 26 may be mounted on cylindrical element 10. In order to ensure that rider 26 acts follows the threaded configuration as a nut, it is provided with at least one engagement feature 28 configured for interlocking engagement with at least part of at least two of the radially projecting ridges. In the example of FIG. 5A, engagement features 28 are implemented as a row of corresponding ridges deployed along one side of the inner surface of rider 26. The ridges are localized to one side to allow adjustment of the helical angle of element 10 without locking movement of the rider. Depending upon the state to which element 10 is switched, rider 26 operates alternatively as a right-handed nut-and-bolt arrangement, a left-handed nut-and-bolt arrangement, or is locked so as to rotate freely in its place without advancing along element 10. Switching of element 10 between the different states is generally performed while engagement features 28 are away from slit 20, typically by providing a suitable synchronization system associated with the actuation mechanism.

FIG. 5B shows a further example of a rider 26, in this case implemented as a complementary cylindrical member having a longitudinal slit 30. As a result, when slit 30 is aligned substantially opposite slit 20, the state of element 10 may be adjusted and the rider conforms similarly to the current helical angle.

In a further option, rider 26 may be implemented as a complementary cylindrical threaded member with a fixed helical angle, such as a standard nut. In this case, when the helical angle of the projecting ridges assumes a first value which matches the thread of rider 26, the rider can be readily rotated relative to the cylindrical element about the central axis. When the helical angle of the projecting ridges of element 10 is changed from that of the rider, the rider becomes progressively braked by frictional contact between the projecting ridges and the thread of rider 26 until rider 26 becomes locked against rotation relative to element 10.

Figure 6:
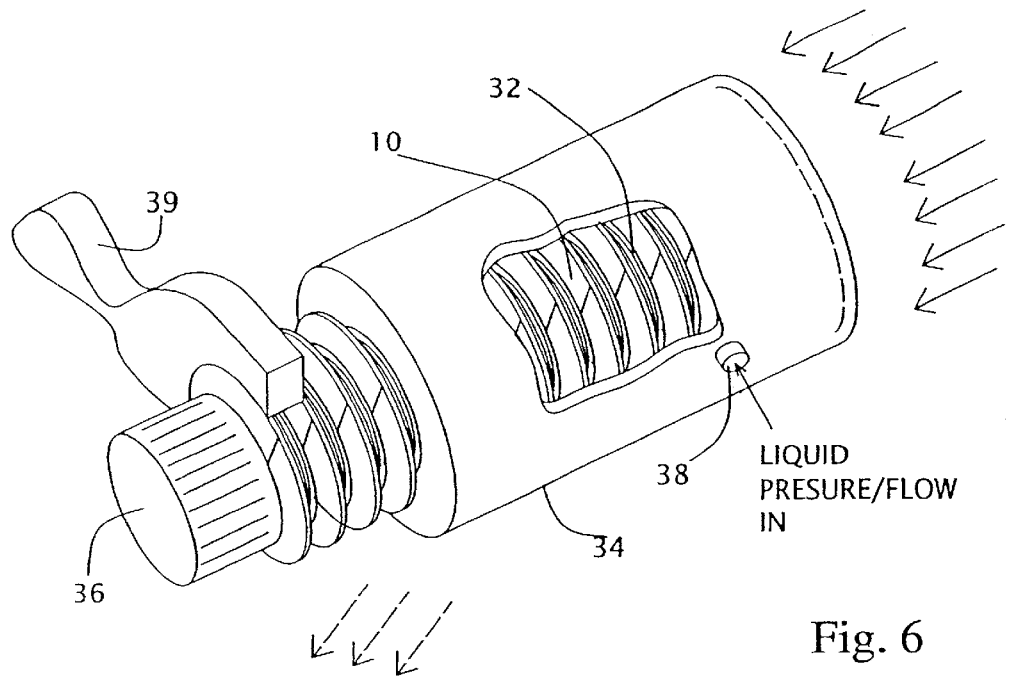
FIG. 6 is a partially cut-away isometric view of a flow-regulating configuration constructed using an apparatus according to the present invention.

Turning now to FIG. 6, it should be appreciated that the apparatus of the present invention may be used to advantage in a wide range of applications, many of which do not require mechanical engagement with the thread. By way of example, FIG. 6 shows a variable fluid flow-regulating configuration which employs element 10 described above. Specifically, a cylindrical surface 32, in this case provided by the inner surface of a tube 34, is deployed adjacent to radially projecting ridges 18 so as to define a variable pitch flow channel between cylindrical element 10 and surface 32.

In the case shown here, flow through the hollow center of element 10 is prevented, such as by a plug 36. One end of element 10 is preferably anchored against rotation relative to tube 34, typically by a lateral lock pin 38. The actuation mechanism is then implemented as a device, represented here schematically by a wrench 39, for applying a torque to the opposite end of element 10 relative to tube 34.

When element 10 assumes its zero-pitch state as shown, ridges 18 form a series of substantially closed ring seals against surface 32, thereby substantially sealing against fluid flow from an inlet end of tube 34 to its outlet. When element 10 is brought into a helical threaded state, the channel formed between projecting ridges 18, together with surface 32, form an elongated helical flow-reducing channel which permits a controlled flow of fluid from the inlet end of tube 34 to its outlet. If element 10 is brought into a double-threaded state, the flow is further increased by the availability of two helical flow channels, each of half the length of the helical channel in the single-threaded state.

Figures 7A, 7B:
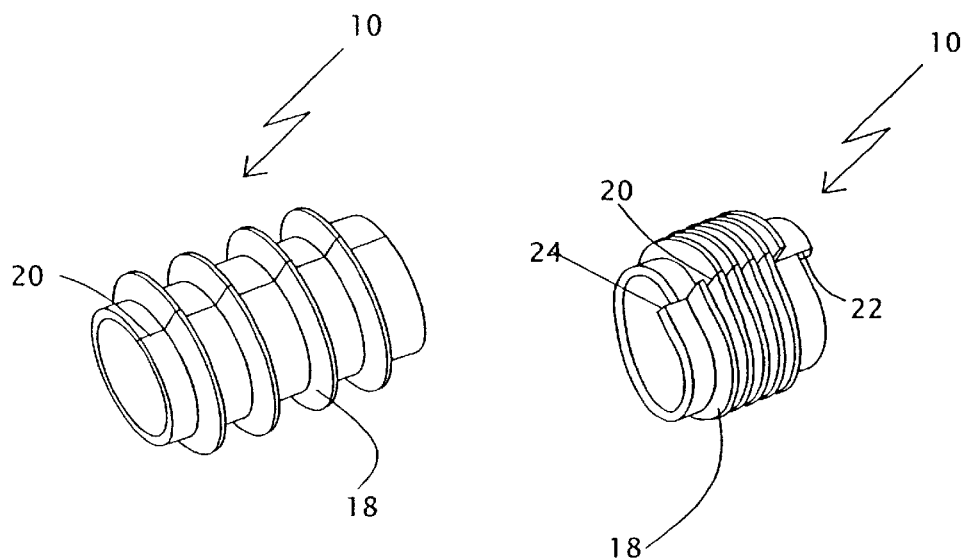
FIG. 7A is a schematic isometric view of a further implementation of an apparatus for providing a variable pitch thread for use in a switchable conveyor system, shown here in an "off" state.
FIG. 7B is a schematic isometric view of the apparatus of FIG. 7A shown in a left-handed "on" state.

Turning now to FIGS. 7A and 7B, it should also be noted that the present invention can be implemented with a widely varying range of relative dimensions between projecting ridges 18 and the diameter of element 10. For bolt-like functions, the height of ridges 18 as measured from the base of the interposed furrows is generally less than about 10% of the diameter of element 10. For other application, however, the height of ridges 18 may be significantly more than 10%, in some cases reaching values similar to the diameter itself. Parenthetically, it will be noted that the diameter referred to is taken to be the outer diameter of the cylindrical element neglecting the height of ridges 18.

By way of example, FIGS. 7A and 7B show an element 10, constructed and operative according to the teachings of the present invention, for use in a switchable conveyor system. In this case, ridges 18 are implemented as relatively large radially projecting flanges. In the zero-pitch "off" state of FIG. 7, no net flow is generated by turning of element 10 about its central axis. When switched to the helical "on" state of FIG. 7B, element 10 serves as a conveyor for particulate material. By employing such an element, feed of a particulate material may be started, stopped and even reversed on demand without needing to interrupt a driving relation to a rotational drive system (not shown). Such a system is highly desirable for a wide range of industrial and other processes.

Figure 8:
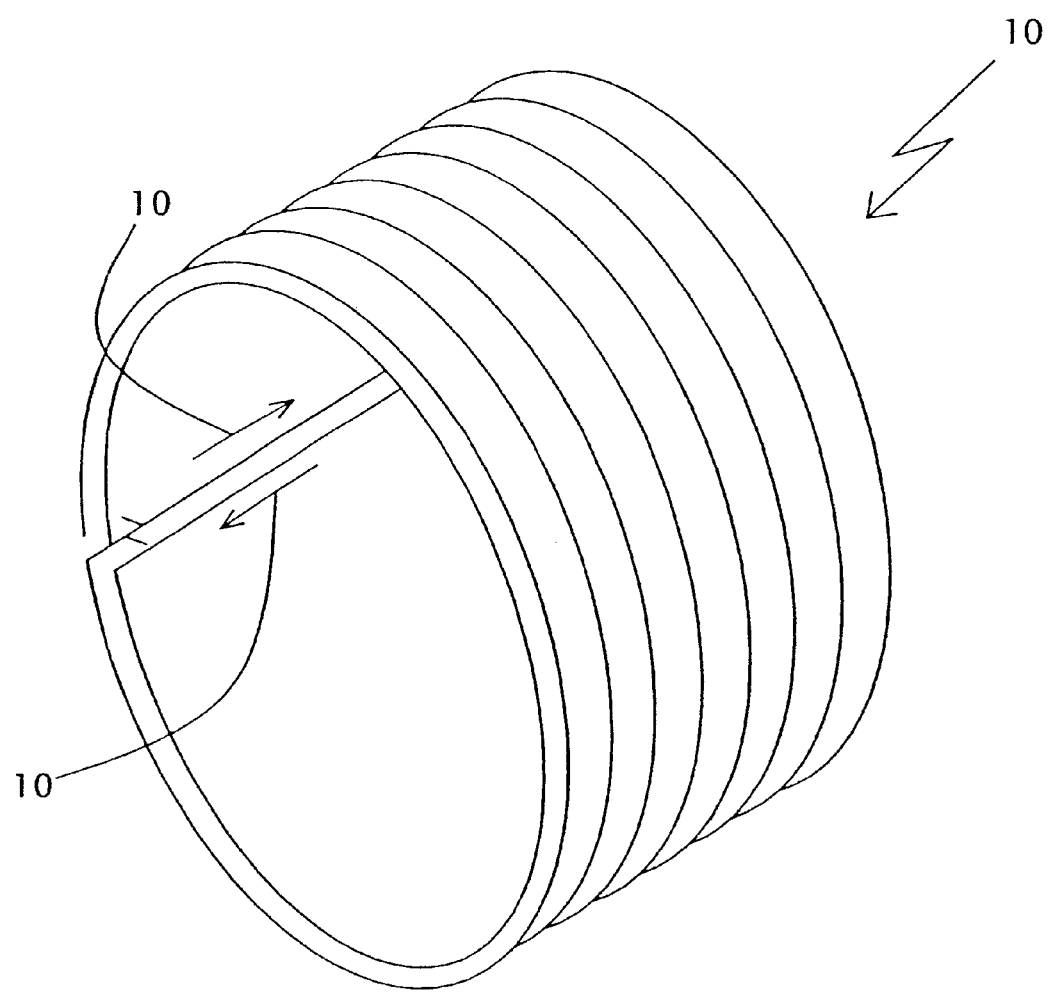
FIG. 8 is a schematic isometric view of an apparatus for providing a variable pitch thread illustrating an axial actuation system.

Turning finally to FIG. 8, it will be noted that the actuation mechanism need not be a torque-applying mechanism. Particularly for relatively large-diameter short elements, a linear actuation mechanism, acting axially along the edges of slit 20 may be advantageous. Such a linear actuation mechanism is represented here schematically by arrows 40. Optionally, in this and other implementations, alignment of the edges 22 and 24 adjacent to slit 20 may be preserved by providing an interlocking track (not shown), typically integrally formed, integrated with the edges and formed so as to delineate a direction of relative movement between the edges.

It will be appreciated that the above descriptions are intended only to serve as examples, and that many other embodiments are possible within the spirit and the scope of the present invention.

What is claimed is:

1. An apparatus comprising:
   (a) a hollow cylindrical element having a first end, a second end and defining a virtual central axis, said cylindrical element being configured to provide a plurality of parallel, radially projecting ridges extending circumferentially around said cylindrical element and spaced apart with a given step as measured parallel to said central axis, said cylindrical element further featuring a slit extending substantially parallel to said central axis from said first end to said second end, said slit being bordered by opposing edges; and
   (b) an actuation mechanism configured to selectively generate controlled relative displacement between said opposing edges so as to vary a helical angle of said projecting ridges relative to said central axis.

2. The apparatus of claim 1, wherein said actuation mechanism is configured to relatively displace said opposing edges such that said plurality of projecting ridges together form alternatively a helical pattern and a pattern of substantially closed rings.

3. The apparatus of claim 1, wherein said actuation mechanism is configured to apply a torque between said first and second ends about said central axis.

4. The apparatus of claim 1, wherein said cylindrical element is configured such that, in the absence of an externally applied torque, each of said radially projecting ridges approximates to a closed circumferential ridge.

5. The apparatus of claim 1, wherein said cylindrical element is configured such that, in the absence of an externally applied torque, said plurality of radially projecting ridges together approximate to a single threaded configuration.

6. The apparatus of claim 1, wherein said radially projecting ridges project radially inwards.

7. The apparatus of claim 1, wherein said radially projecting ridges project radially outwards.

8. The apparatus of claim 1, further comprising a rider mounted on said cylindrical element, said rider having at least one engagement feature configured for interlocking engagement with at least part of at least two of said radially projecting ridges.

9. The apparatus of claim 8, wherein said rider is implemented as a complementary cylindrical member having a longitudinal slit such that, when said longitudinal slit is aligned substantially opposite said slit of said cylindrical element, said rider conforms substantially to said helical angle.

10. The apparatus of claim 8, wherein said rider is implemented as a complementary cylindrical threaded member with a fixed helical angle such that, when said helical angle of said projecting ridges assumes a first value, said rider can be readily rotated relative to said cylindrical element about said central axis and, when said helical angle of said projecting ridges assumes a second value, said rider is locked against rotation relative to said cylindrical element.

11. A flow-regulating configuration comprising:
    (a) the apparatus of claim 1; and
    (b) a cylindrical surface deployed adjacent to said plurality of radially projecting ridges so as to define a variable pitch flow channel between said cylindrical element and said cylindrical surface.

12. A method for producing a variable pitch thread comprising the steps of:
    (a) providing a hollow, cylindrical element having a first end, a second end and defining a virtual central axis, said cylindrical element being configured to provide a plurality of parallel, radially projecting ridges extending circumferentially around said cylindrical element and spaced apart with a step a as measured parallel to said central axis, said cylindrical element further featuring a slit extending substantially parallel to said central axis from said first end to said second end, said slit being bordered by opposing edges; and
    (b) relatively displacing said opposing edges so as to vary a helical angle of said projecting ridges relative to said central axis.

13. An apparatus for providing variable ratio conversion of rotational motion to linear displacement, the apparatus comprising:
    (a) a hollow cylindrical element having a first end, a second end and defining a virtual central axis, said cylindrical element being configured to provide a plurality of parallel, radially projecting ridges extending circumferentially around said cylindrical element and spaced apart with a given step as measured parallel to said central axis, said cylindrical element further featuring a slit extending substantially parallel to said central axis from said first end to said second end, said slit being bordered by opposing edges;
    (b) a rider having at least one engagement feature configured for engagement with at least part of at least two of said radially projecting ridges, said rider being configured so as to allow relative rotation between said rider and said cylindrical element; and
    (c) an actuation mechanism configured to selectively generate controlled relative displacement between said opposing edges so as to vary a helical angle of said projecting ridges relative to said central axis,
    such that relative rotational motion between said rider and said cylindrical element generates relative linear displacement between said rider and said cylindrical element parallel to said central axis, wherein a ratio of said rotational motion to said linear displacement is defined by said helical angle.

14. The apparatus of claim 13, wherein said actuation mechanism is configured to vary said helical angle such that said projecting ridges selectively produce a helical thread and a zero-pitch thread.

15. The apparatus of claim 14, wherein said actuation mechanism is further configured to vary said helical angle such that said projecting ridges selectively produce a right-handed double-helical thread.

16. The apparatus of claim 13, wherein said actuation mechanism is configured to vary said helical angle such that said projecting ridges selectively produce a right-handed helical thread and a left-handed helical thread.

17. The apparatus of claim 13, wherein said rider is implemented as a complementary cylindrical member deployed around said cylindrical element.

18. The apparatus of claim 13, wherein said rider is implemented as a complementary cylindrical member having a longitudinal slit such that, when said longitudinal slit is aligned substantially opposite said slit of said cylindrical element, said rider conforms substantially to said helical angle.

19. The apparatus of claim 13, wherein said rider is implemented as a portion of a cable engaged between two of said radially ridges.

* * * * *

UNITED STATES PATENT AND TRADEMARK OFFICE
CERTIFICATE OF CORRECTION

PATENT NO. : 6,401,758 B1  
DATED : June 11, 2002  
INVENTOR(S) : Ziv-Av

It is certified that error appears in the above-identified patent and that said Letters Patent is hereby corrected as shown below:

Column 10,  
Line 3, the word "projecting" has been omitted in error between "radially………...ridges"

Signed and Sealed this

Twenty-second Day of October, 2002

Attest:

Attesting Officer

JAMES E. ROGAN  
Director of the United States Patent and Trademark Office